Oct. 12, 1926.
M. AXILROD
1,602,806
POWER TRANSMISSION MECHANISM
Filed May 4, 1921     4 Sheets-Sheet 4
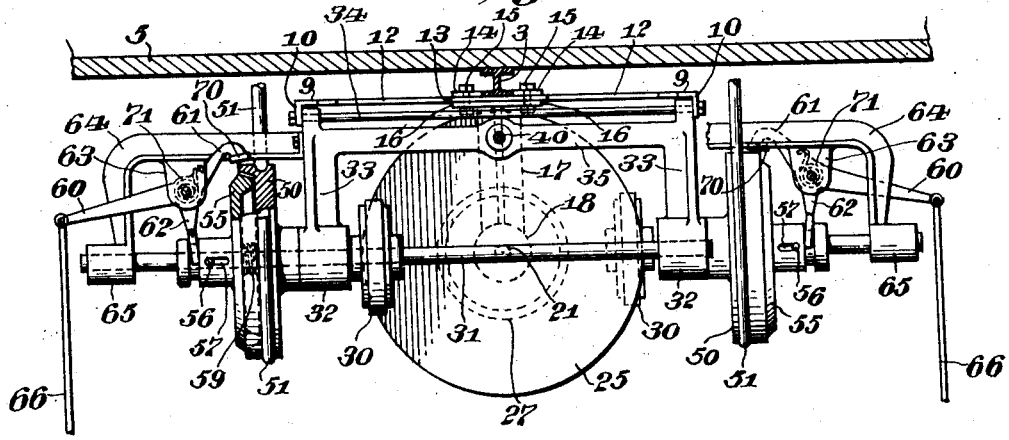
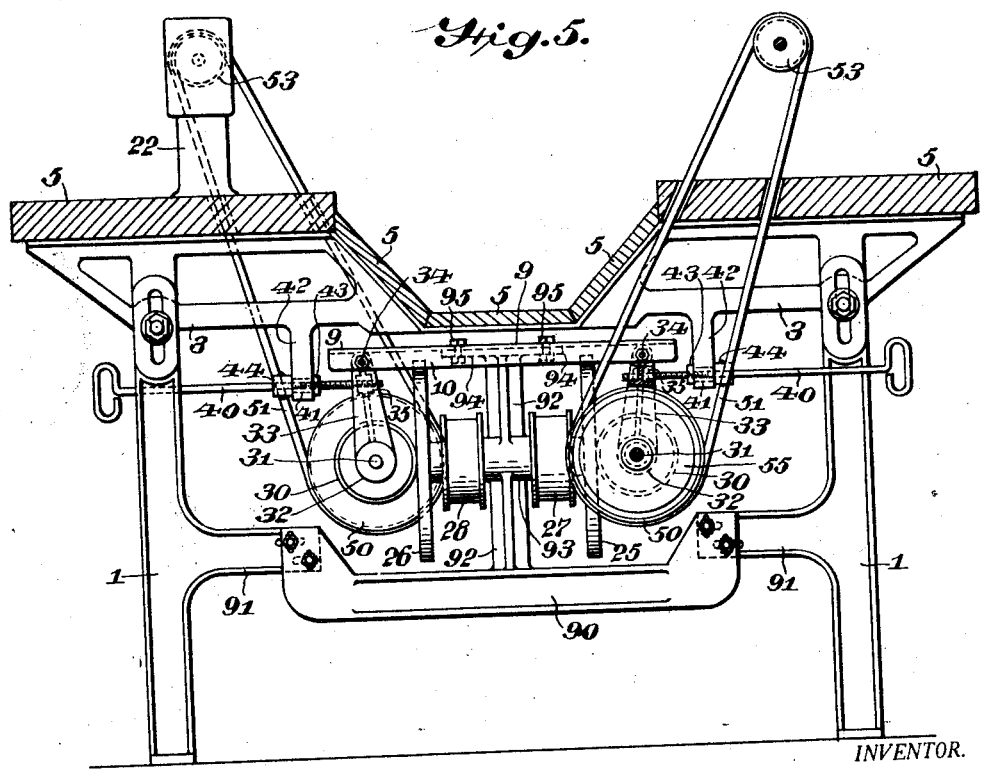
INVENTOR.
Meyer Axilrod
BY Cyrus N. Anderson
ATTORNEY.

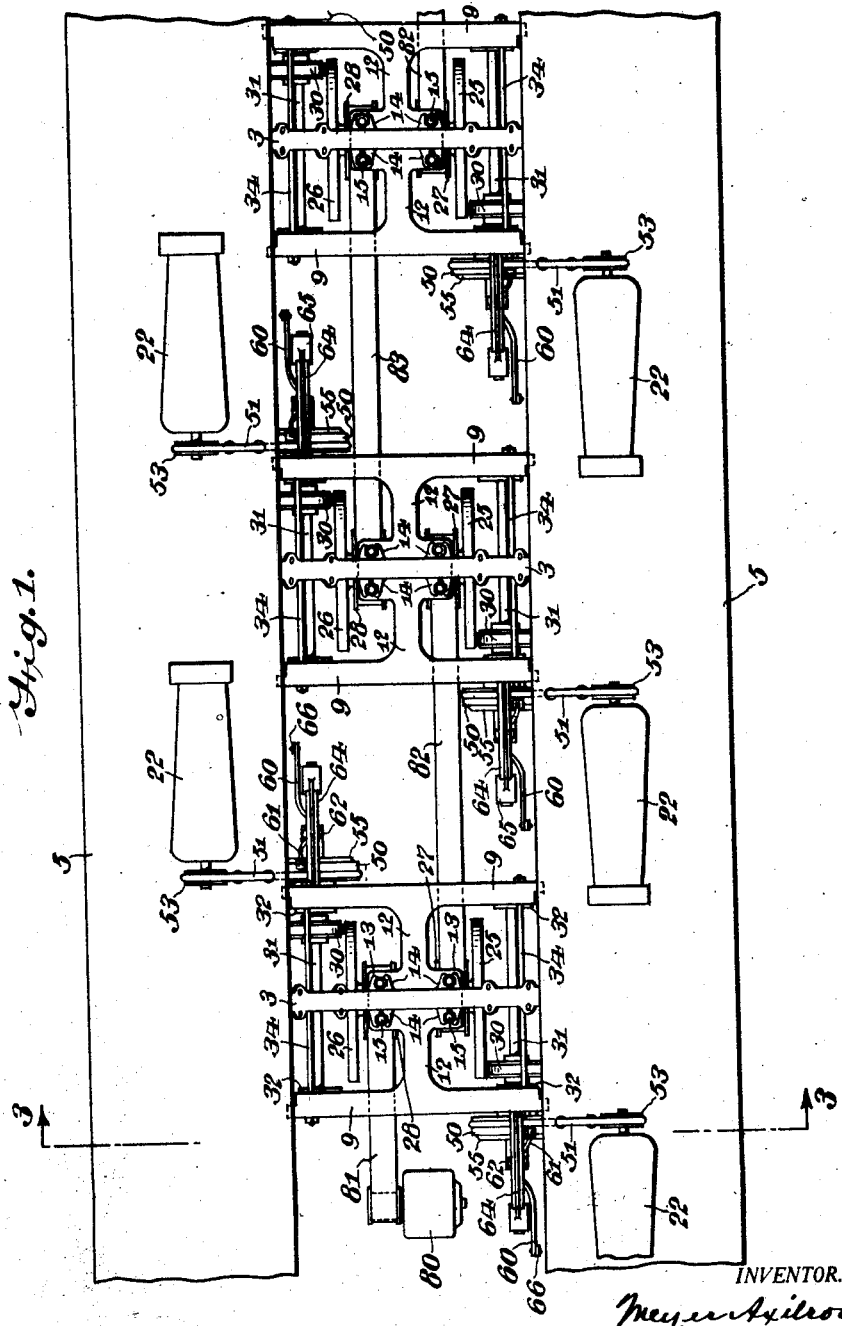

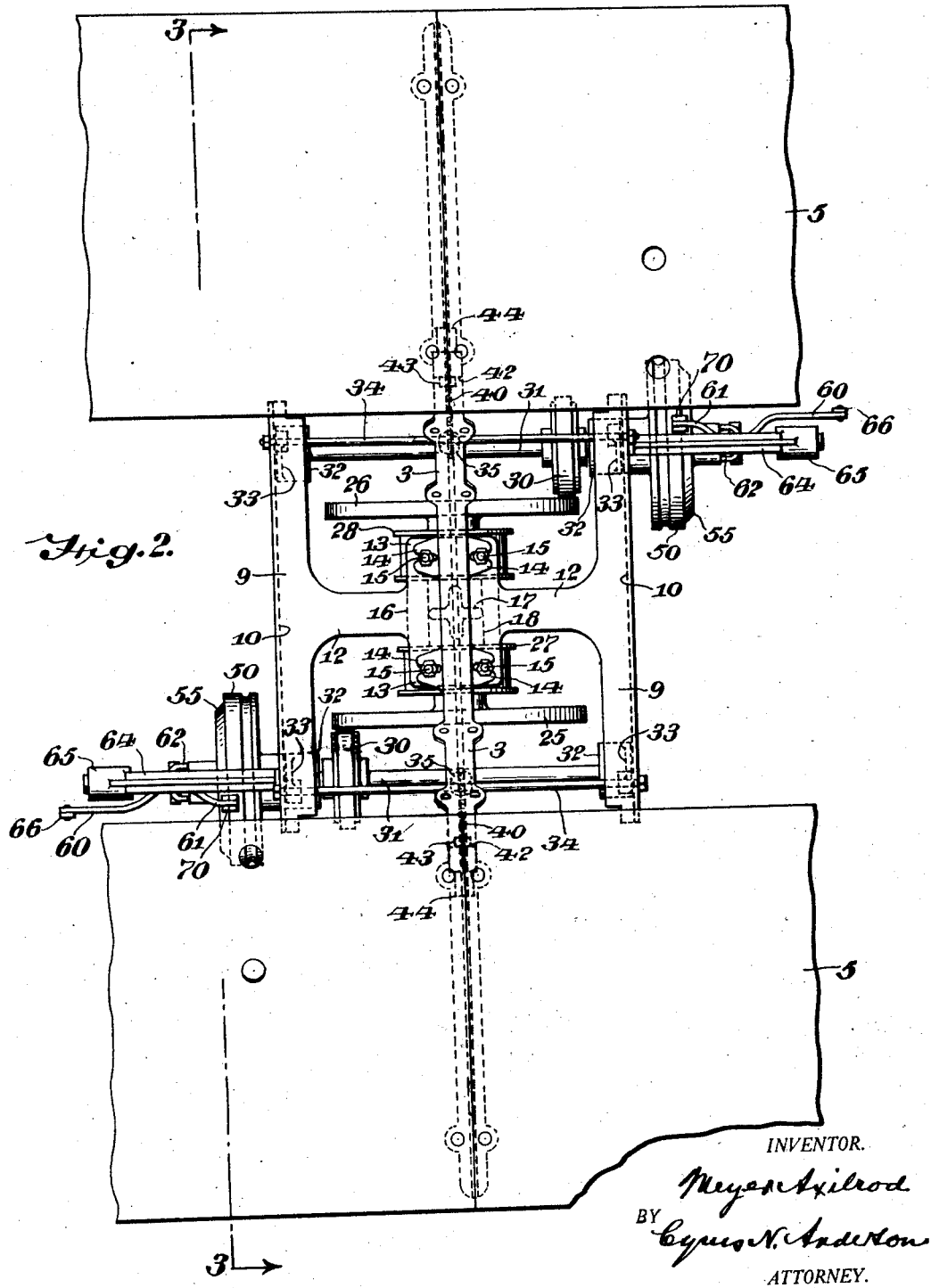

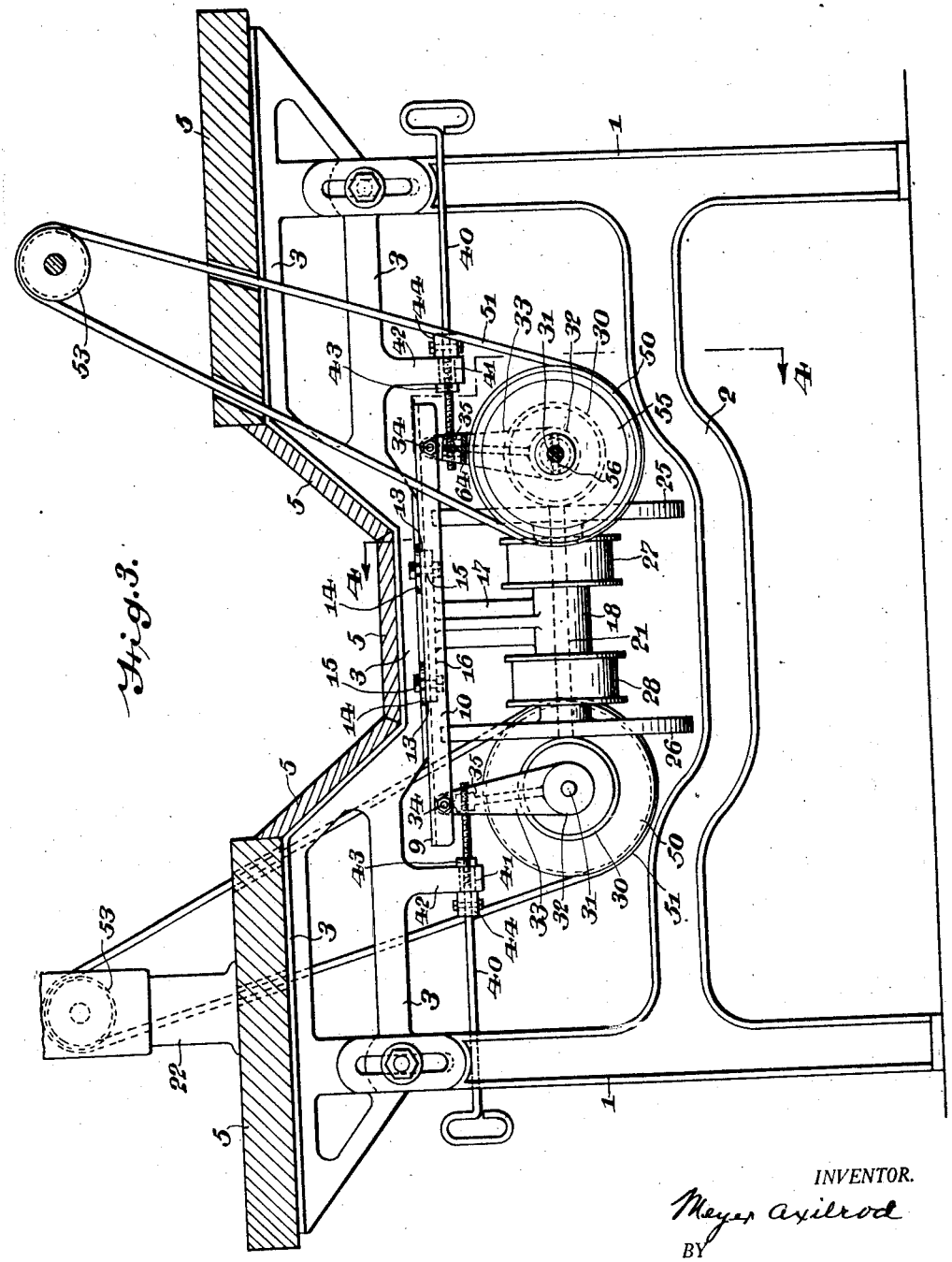

Patented Oct. 12, 1926.

1,602,806

UNITED STATES PATENT OFFICE.

MEYER AXILROD, OF READING, PENNSYLVANIA.

POWER-TRANSMISSION MECHANISM.

Application filed May 4, 1921. Serial No. 466,848.

My invention relates to power transmission mechanism which is particularly well adapted for use in the driving or operation of a number of machines arranged in spaced and successive or series relation with respect to each other.

One of the objects of my invention is to provide an improved means for disconnecting any one of a number or series of machines from the power without interfering with the operation of the remaining machines of the series.

Another object of the invention is to provide means for pivotally supporting a portion of the mechanism for driving the respective machines of the series and means for causing pivotal movement of the said supporting means for disconnecting the portion of the transmission mechanism carried thereby from another portion of said transmission mechanism.

It is also an object of my invention to provide an improvement in the means for supporting the power transmission mechanism and also an improvement in the arrangement of constituent parts of the said mechanism with relation to two lines or series of machines one line or series being situated on one side and the other on the opposite side of a table or other suitable support.

In the accompanying drawings I have illustrated certain convenient forms of embodiment of my invention but it will be understood that the said invention is susceptible of embodiment in other forms of construction than that shown and that changes in the details of construction may be made within the scope of the claims without departing from the said invention.

In the drawings, Fig. 1 is a top plan view of a portion of a table, portions of the top being omitted, and showing the power transmission and the supports therefor embodying my invention, the power transmission being employed, in the construction shown, for operating two rows of sewing machines one row being situated upon one side and the other upon the opposite side of the table top;

Fig. 2 is an enlarged top plan view of a small section of the structure shown in Fig. 1;

Fig. 3 is a transverse sectional view taken on the line 3—3 of Figs. 1 and 2;

Fig. 4 is a sectional elevational view taken on the line 4—4 of Fig. 3 of the drawings; and Fig. 5 is a transverse sectional view similar to that shown in Fig. 3 but showing a modified construction of means for supporting the power transmission mechanism.

Referring to the drawings: 1 designates the legs of the table structure connected at points intermediate their ends by cross bars 2 which are integral therewith and at their upper ends by top rails 3. Each top rail 3 is adjustably connected by a slot and bolt connecting means to the upper ends of a pair of legs 1. The top of the table is connected to the top rails 3 in known manner.

For the purpose of supporting the power transmission mechanism I have provided H-shaped plate members the opposite sides 9 of which are provided with downward depending flanges 10 at their outer edges. The sides 9 are connected by the cross bar 12 which is provided with projections 13 at its opposite edges which are adapted to be seated against the under sides of the slotted lugs 14 which project from opposite sides of the lower edge portion of the central part of each of the top rails 3. There is one of these H-shaped plate members secured to the under side of each of the top rails 3. Bolts 15 extend through the slots in the projections 14 and also through holes in the projections 13 as well as through holes in the laterally extending horizontal flanges 16 provided at the upper end of a depending shaft support or bracket 17 and secure and hold the H-shaped plate member previously referred to together with the flanges 16 to the slotted or notched lugs 14 upon the top rails 3. The end portions of the sides 9 which project in opposite directions from the ends of the cross bar 12 constitute arms which extend toward the opposite side edges of the table.

At the lower end of each of the brackets or supports 17 a bearing 18 is provided for supporting a shaft 21. It will be observed that, in the construction shown, there are a plurality of the shafts 21 arranged at intervals along the length of the table and also that the said shafts extend transversely of the table and are substantially in the planes of the respective leg structures upon which they are supported.

The number of leg structures and of shaft supporting means will depend to a large extent upon the length of the table and upon the number of machines 22 it is desired to support in a row or rows upon the table for operation. Each of the shafts 21 is provided upon its opposite end portions with driving friction disks 25 and 26 and also with pulleys 27 and 28 the latter situated inside of the said disks and against the opposite ends of the bearing sleeves 18.

Each of the driving friction disks 26 is adapted to drive a friction disk 30 adjustably secured to and supported upon a shaft 31 which in turn is supported in bearing 32 at the lower ends of depending arms 33 pivotedly supported at their upper ends upon the oppositely disposed end portions (constituting arms) of the sides 9 of one of the H-shaped members previously referred to. These depending arms 33 are connected to and pivotedly supported upon the outer ends of the sides or arms 9 by means of a rod 34 which extends through outer end portions of the flanges 10. These arms 33 are connected together by means of a tie-bar 35.

The friction disks 30 may be adjustably secured to the shafts 31 in any desired manner, as in the manner shown in Letters Patent, No. 1,320,194, issued to me October 28, 1919. Upon adjustment of a disk 30 from the outer edge of a friction disk 15 toward the axis of the latter the speed of rotation at which the former may be driven decreases. If the said disk 30 be adjusted to a point beyond the said axis it is apparent that its direction of rotation will be reversed.

Upon reference to Figs. 3 and 5 of the drawing it will be observed that the driven friction disks 30 are adapted to be swung inwardly against and away from the faces of the driving disks 25 and 26. As a means for effecting inward and outward adjustment of the frame structures comprising the arms 33, I have provided the adjusting rods 40 which are rotatably supported in holes 41 provided in projections 42 depending from the under sides of the top rails 3. It will be observed that there are two of these projections 42 depending from the under side of each of the top rails. The inner end portions of these rods 40 are screw threaded as indicated and nuts 43 thereon prevent the said rods 40 from moving outward while collars 44 upon the said rods 40 upon the opposite sides of the projections 42 from the nuts 43 prevent inner movement of the said rods. The said rods are thus prevented from moving longitudinally. The inner ends of the said rods have screw threaded connection with the central portions of the tie bars 35 so that when it is desired to adjust the frame structures comprising the arms 33 inwardly or outwardly this may be done by turning the said rods to the left or right, the screw threads being the usual right hand threads. The turning of the said rods to the left forces the said frame structures inwardly to press the driven friction disks against the adjacent faces of the driving friction disks while turning the said rods in the opposite direction causes movement of the said driven friction disks in the opposite direction. By lowering the points of connection of the rods 40 to the frames for supporting the shafts 31 with respect to the length of the arms 33 the force with which the friction disks 30 is pressed against the driving friction disks 25 and 26 may be increased.

Each of the shafts 31 is provided with a drive pulley 50 loosely mounted thereon from which a driving cord or band 51 extends upwardly and outwardly over the driving pulley 53 of a machine to operate the same. In the construction as shown sewing machines are depicted but it will be understood that the power mechanism embodying my invention may be employed for the driving of various different kinds of machines.

For the purpose of connecting the respective pulleys 50 to the shafts 31 to operate the said machines I have provided clutch members 55 which are longitudinally movable upon the shafts 31. These clutch members 55 are connected to the shafts 31 by means of pins 56 which extend through the said shafts and through slots 57 formed in hubs which are connected with the said clutch members 55. Springs 59 indicated in dotted lines in Fig. 4 of the drawing which are situated intermediate the pulleys 50 and the clutch members 55 tend to separate the latter from the former. For the purpose of actuating the clutch members 55 and for controlling the pulleys 50, I have provided levers having arms 60, 61 and 62. These three-armed levers are pivoted upon projections 63 which depend from brackets 64 carried by one of the arms 33 of the swinging shaft supporting frames. At their outer depending ends the brackets 64 are provided with bearings 65 which support the outer ends of the shafts 31 adjacent the pulleys 50 and clutches 55. There is one of these brackets for each of the shafts 31.

Each of the three-armed levers is adapted to be actuated and controlled by means of a link 66, only a portion of which is connected to a the lower end of which is connected to a treadle (not shown). The outer upper end of each arm 61 is provided with a brake shoe 70 which, under the influence of a spring 71 and of one of the springs 59, is adapted to be forced down upon the peripheral portion of a pulley 50 to brake and hold the same against operation.

When pressure upon the treadle (not shown) is released the spring 59 operates to move the clutch member 55 toward the left to release the pulley 50. The said spring through the arm 62 also aids the spring 71 to force the brake shoe 70 down upon a peripheral portion of the pulley 50 to stop rotation of the same and thus put a stop to the operation of the machine with which the driving belt or cord upon the said pulley is connected.

As already indicated, the mechanism comprising the frame structure including the arms 33, the driven friction disks, the pulley and clutch mechanism, the lever arms 60, 61 and 62 is duplicated at the opposite ends of each of the shafts 21. However, such duplication may be dispensed with and such mechanism provided at one end only of alternate shafts. In such case only half the number of machines would be operated as are operated according to the present arrangement.

One of the advantages resulting from swingingly supporting the pulleys 50 as shown is that when a frame structure supporting a pulley is moved outwardly so as to disengage the driven disk 30 from a driving friction disk 25 or 26, as the case may be, the cord or driving belt 51 is allowed to become slack. The provision that these belts or pulleys shall be in a slack condition when the machine is inoperative prevents the stretching of the said belts or cords and enhances the period during which the same may be satisfactorily used.

The power for driving the transmission mechanism may be derived from any suitable source. In the construction as shown an electric motor 80 is employed from the shaft of which a belt 81 extends to a pulley 28 to drive the shaft 21 to which the said pulley is secured. The next succeeding shaft 21 is driven from the pulley 27 by means of a driving belt 82 which passes over a pulley 27 on the said next succeeding shaft. The shaft succeeding the last mentioned shaft is driven by a succeeding driving belt 83 which passes over the pulleys 28 on said shafts and so on to the end of the series.

Although I have shown the transmission mechanism supported upon the H-shaped members comprising the sides or arms 9 which are secured to the under sides of the top rails 3 it is to be understood that my invention is not limited to a separate member of this character but that oppositely extending arms corresponding to the arms formed by the opposite ends of the sides 9 may be otherwise formed and connected with the said top rails. Such connection may be integral, if desired, in which case the depending shaft supports 17 also, if desired, may be connected with the said top rails.

In Fig. 5 of the drawing I have shown a modified construction in which the means for supporting the transmission mechanism comprises a bracket 90 secured so as to be vertically adjustable to the inner ends of projections 91 which extend inwardly from the inside edges of the legs 1. Each of the brackets 90 comprises a vertical standard or support 92 which is provided intermediate its ends with a sleeve having a bearing 93 for the shaft 21 upon the outer end portions of which the driving friction disks 25 and 26 and the pulleys 27 and 28 are secured. The upper end of the post or standard 92 is provided with lateral flange plates 94 to which the H-shaped member previously referred to is secured by means of bolts 95. To the outer ends of the sides 9 of the said H-shaped member, which outer ends may be regarded as arms, the depending swinging frame structure comprising the arms 33 for supporting the shaft 31 and the pulley and clutch members 50 and 55 are secured in the same manner as shown in the preceding figures of the drawing.

Having thus described my invention, what I claim and desire to secure by Letters Patent is:

1. In apparatus of the character described, the combination of legs arranged in pairs, top rails having connection with said legs, arms having connection with said top rails and extending outwardly and in spaced relation thereto, adjustable shaft supports having pivotal connection with said arms, and means for causing pivotal movement of said supports.

2. In apparatus of the character described, the combination of legs arranged in pairs, top rails supported at the upper ends of said legs, arms having connection with the central portion of said rails, said arms arranged in pairs and extending outwardly in opposite directions in spaced relation to said top rails, and shaft supports pivotedly connected to the outer ends of said arms.

3. In apparatus of the character described, the combination of legs arranged in pairs, top rails supported at the upper ends of said legs, arms having connection with the central portion of said rails, said arms arranged in pairs and extending outwardly in opposite directions in spaced relation to said top rails, shaft supports pivotally connected to and depending from said arms, and means for effecting pivotal adjustments of said shaft supports.

4. In apparatus of the character described, the combination of a four-armed member, the arms of said member being arranged in pairs and extending outwardly in opposite direction, shaft supporting means pivotally connected to and depending from the outer ends of said pairs of arms, shafts supported by said shaft supporting means, and means for driving said shafts.

5. In apparatus of the character described, the combination of a four-armed member, the arms of said member being arranged in pairs and extending outwardly in opposite direction, shaft supporting means pivotally connected to and depending from the outer ends of said pairs of arms, adjusting means having connection with the said shaft supporting means for adjusting the same, shafts supported by said shaft supporting means, and means for driving said shafts.

6. In apparatus of the character described, the combination of arms arranged in pairs, the pairs of arms being arranged in couples and extending in opposite directions from their support, depending swinging arms pivotally connected to the outer arms of the said pairs, tie-bars connecting the said swinging arms, shafts supported in bearings carried by said swinging arms, a revoluble shaft intermediate of and extending substantially at right angles to the first mentioned shafts, and means whereby revolution of the said intermediate shaft causes revolution of the first named shafts.

7. In apparatus of the character described, the combination of legs arranged in pairs, top rails supported upon the upper end portions of said legs, arms having detachable connection with the said top rails, depending shaft supporting brackets detachably connected with the said rails, shafts supported in the said depending brackets, means for causing rotation of said shafts, brackets pivotally connected with the outer ends of said arms and depending therefrom, a plurality of shafts arranged substantially at right angles to the first named shafts and supported in the said pivotally supported brackets, and means for effecting pivotal adjustment of the said pivotally supported brackets.

8. In apparatus of the character described, the combination of legs arranged in pairs, vertically arranged shaft supporting brackets having operative connection with and supported by the said legs, outwardly extending arms having detachable connection with the said brackets, a plurality of spaced parallel shafts supported by the said brackets, brackets pivotally connected at their upper ends to the outer end portions of said arms, the said brackets extending substantially at right angles to the said shafts, shafts supported by the said pivoted brackets, means whereby rotation of the first named parallel shafts causes rotation of the second named shafts, and means whereby the said second named shafts may be adjusted so as to operatively connect and disconnect the same from the said first named shafts.

9. In power transmission mechanism, the combination of a plurality of shafts situated at intervals and in substantially parallel relation with respect to each other, a plurality of couples of shafts also arranged at intervals and situated in operative relation to the ends of the first named shafts and extending at substantially right angles thereto, means intermediate the opposite ends of first named shafts and the shafts of each couple of the second named shafts whereby rotation of the former causes rotation of the latter, and means for disconnecting any one of the second named shafts from any one of the first named shafts with which it may be associated to render such second named shaft inoperative.

10. In power transmission mechanism, the combination of a plurality of shafts situated at intervals and in parallel relation to each other, the said shafts extending transversely of a table support, a plurality of shafts arranged in couples and situated at intervals and extending longitudinally of the said table support, the said last named shafts being arranged substantially in alinement with each other, and the shafts of the respective couples being situated adjacent and in operative relation to the opposite ends of the first named shafts, means for independently and pivotally supporting each of the last named shafts, means intermediate the first and second named shafts whereby the rotation of the former causes rotation of the latter, and means for adjusting any one of the second named shafts about its pivot so as to disconnect it from any one of the first named shafts.

11. In a power transmission mechanism, the combination of a plurality of shafts arranged at intervals and in parallel relation with respect to each other, means for rotating one of said shafts, means intermediate of and operatively connecting adjacent shafts whereby rotation of said last mentioned shaft causes rotation of the other shafts, a plurality of shafts arranged substantially at right angles to the first named shafts, the said second named shafts being arranged in couples and those of each couple being situated adjacent the opposite ends of the first named shafts, means intermediate the respective shafts of the first named shafts and the shafts of the respective couples whereby rotation of the first named shafts causes rotation of the second named shafts, devices adapted to be operated from the said second named shafts, and means intermediate each of the said second named shafts and the said devices for effecting operation of the latter.

12. In a power transmission mechanism, the combination of a plurality of shafts arranged at intervals and in parallel relation with respect to each other, means for rotating one of said shafts, means intermediate of and operatively connecting adjacent shafts whereby rotation of said last mentioned shaft causes rotation of the other shafts, a plurality of shafts arranged substantially at right angles to the first named shafts, the second named shafts being arranged in couples and situated adjacent the opposite ends of the first named shafts, means intermediate the first named shafts and the shafts of the respective couples whereby rotation of the first named shafts causes rotation of the second named shafts, and means whereby the speeds of rotation of the second named shafts may be varied as desired and independently of each other.

13. In a power transmission mechanism, the combination of a plurality of shafts arranged at intervals and in spaced relation with respect to each other, means for rotating one of said shafts, means intermediate of and operatively connecting adjacent shafts whereby rotation of said last mentioned shaft causes rotation of the other shafts, a plurality of shafts arranged substantially at right angles to the first named shafts, the second named shafts being arranged in couples, means intermediate the shafts of the respective couples and the first named shafts whereby rotation of the latter causes rotation of the second named shafts, means whereby the speeds of rotation of the second named shafts may be varied as desired and independently of each other and whereby the directions of rotation thereof may be reversed, devices adapted to be operated from the said second named shafts, and means intermediate each of the said second named shafts and the said devices for effecting operation of the latter.

14. In a machine of the character described, the combination of a plurality of shafts arranged at intervals and in parallel relation with respect to each other, means for rotating one of said shafts, means intermediate of and operatively connecting adjacent shafts whereby rotation of said last mentioned shaft causes rotation of the other shafts, a plurality of shafts arranged substantially at right angles to the first named shafts, the second named shafts being arranged in couples, friction disks upon each of the shafts of each couple and upon each end of each of the first named shafts, the edges of the disks upon the second named shafts being adapted to contact with the adjacent faces of the disks upon the first named shafts, and the disks upon the said second named shafts being adapted to move across the faces of the disks upon the first named shafts, devices adapted to be operated from the said second named shafts, and means intermediate the said second named shafts and the said devices for effecting operation of the latter.

In testimony that I claim the foregoing as my invention, I have hereunto signed my name this 21st day of April, A. D., 1921.

MEYER AXILROD.